May 8, 1928.
O. C. BRANDT
HOSE COUPLING
Filed July 10, 1924
1,668,547
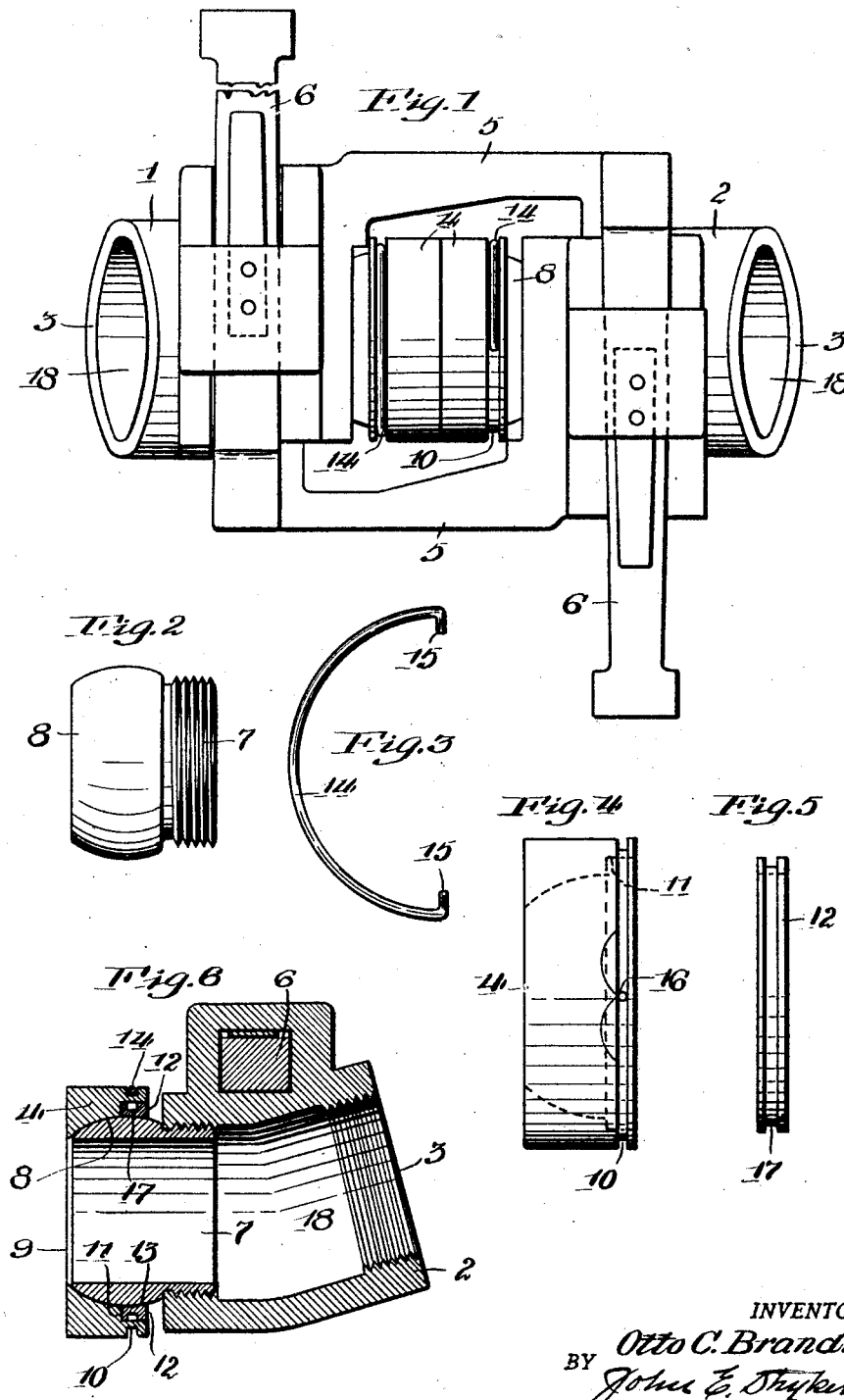
INVENTOR
Otto C. Brandt
BY John E. Stryker
ATTORNEY Patented May 8, 1928.

1,668,547

UNITED STATES PATENT OFFICE.

OTTO C. BRANDT, OF ST. PAUL, MINNESOTA.

HOSE COUPLING.

Application filed July 10, 1924. Serial No. 725,113.

This invention relates to a hose coupling particularly, although not exclusively, adapted for use in the steam or other fluid conduits, extending between cars in a railway train.

My object is to provide a device of this kind which is rendered highly efficient in maintaining a tight joint by reason of a novel arrangement of metallic abutment members whereby said members are free to automatically adjust themselves one to the other when a connection is made.

A further object is to minimize the cost of repairs and replacements by eliminating all small parts from the path of the steam or other fluid in the hose and by protecting the bearing surfaces from dust and other injurious substances which cause rapid wear. Other objects will appear and be more fully pointed out in the following specification and claims.

This invention is an improvement upon the hose coupling of my Patent No. 1,333,791, dated March 16, 1920.

In the accompanying drawings, Figure 1 is a plan view of my improved coupling assembled; Fig. 2 is a detail side elevation of the nipple; Fig. 3 is a similar view of the spring detent; Fig. 4 is a side elevation of one of the abutment members or caps; Fig. 5 is a similar view of the retaining collar or ring; Fig. 6 is a central vertical section through one of the coupler units assembled.

Referring to the drawings the numerals 1 and 2 indicate a pair of identical coupler units or bodies having ends 3 adapted to be joined to hoses, and abutment members 4, arranged to be held in firm engagement one with the other by wings 5 and keys 6, similar to the wings and keys of my above mentioned Patent No. 1,333,791. Threaded in each of the adjacent ends of the units 1 and 2 is a nipple 7 having a spherical head 8 adapted to fit a similarly formed internal surface on the abutment member 4. This member 4 has a smooth end surface 9 for engagement with the companion member, and an annular groove 10 near the opposite end thereof. An annular recess 11 in the member 4 is adapted to receive a retaining ring 12 having a smooth inner surface 13 adapted to engage the spherical head 8 on the nipple 7. The inner circumference of the ring 12 is smaller than the greatest circumference of the head 8 so that said ring can not be pulled off over the head.

To hold the ring 12 within the member 4 a spring 14 carrying a pair of detents 15 is provided. This spring 14 is arranged to lie in the groove 10 in the member 4 and the detents 15 extend radially through holes 16 in the part 4 and into an annular channel 17 in the ring 12.

To assemble one of the coupler units the nipple 7 is inserted through the ring 12, so that said ring engages the head 8 on said nipple, when the nipple is screwed into the threaded bore of the body 2. The abutment member or cap 4 is next placed upon the forward end of the head 8 so as to receive the ring 12 in the recess 11. The detents 15 are finally sprung into the holes 16 which register with the channel 17 in the ring 12, thus connecting said ring with the abutment member 4.

As will now be readily understood, the member 4 is free to tilt on the spherical head of the nipple 7, but is prevented from being withdrawn therefrom by the ring 12 having an inside diameter which is smaller than the diameter of the head 8.

With both of the coupler units thus assembled they may be joined as shown in Fig. 1 by manipulating the wings 5 and keys 6 in the usual manner. These keys 6 press the end surfaces 9 of the members 4 firmly one against the other as said members shift and adjust themselves one with the other so that the bearing surfaces register exactly. On account of the arrangement of the nipple 7 with the spherical head fitting within the member 4, a comparatively wide range of movement of the abutment members is permitted and the surfaces which are pressed one upon another to prevent leakage are protected from dust and the corrosion produced by exposure to the elements.

The surfaces which must fit perfectly (in addition to the ends of the members 4) are, in each coupler unit, that portion of the spherical head 8 which extends from about the vertical plane through the greatest circumference of said head to the outer or front end of the nipple 7. These surfaces are guarded against injury by the overhanging portions of the member 4 and by the ring 12. The latter ring is not subjected to the pressure which prevents leakage between the head 8 and member 4, but fits closely and guards the head where dust would otherwise collect.

It is to be noted that there are no obstructions or small parts apt to be corroded either in the central passage in the nipple 7 or in the passage 18 for steam in the body 2. Further, the retaining ring 12 and detents 15 are disposed externally on said nipple where they can be quickly and easily manipulated to remove the member 4 when necessary.

Having described my invention what I claim as new and desire to protect by Letters Patent is:

1. In a coupler unit, a body portion having a passage-way for fluid, a nipple communicating with said passage-way, a head on said nipple, an abutment member tiltably carried on the outer end of said head, said member being formed to engage a companion unit, and having an annular recess adjacent to said head, a ring encircling the inner end of said head in said recess, said ring having an annular groove and an inner diameter smaller than the greatest thickness of said head, and means extending through said member into said groove for connecting said ring and abutment member.

2. In a coupler unit, a body portion having a passage-way for fluid, a nipple communicating with said passage-way, a head on said nipple, an abutment member tiltably carried on the outer end of said head and having an annular recess adjacent to said head, a ring encircling the inner end of said head in said recess, said ring having an inner diameter smaller than the greatest thickness of said head, and spring actuated detents connecting said ring and abutment member.

3. In a hose coupler unit, a body having a passage-way for fluid, a spherical head projecting from an end of said body and having an open conduit in communication with said passage-way, an abutment cap tiltable on the front periphery of said head and formed with a plain bearing surface for engagement with a companion unit and a perforation near its rear portion, and means for securing said cap on said head comprising a member formed to engage the exterior of said head on the rear periphery thereof and a detent extending through said perforation for detachably connecting said member and cap.

In testimony whereof, I have hereunto signed my name to this specification.

OTTO C. BRANDT.